Dec. 9, 1958 I. H. WELINSKY Re. 24,574
CARBONIZATION OF AGGLOMERATIVE COALS
Original Filed April 4, 1949
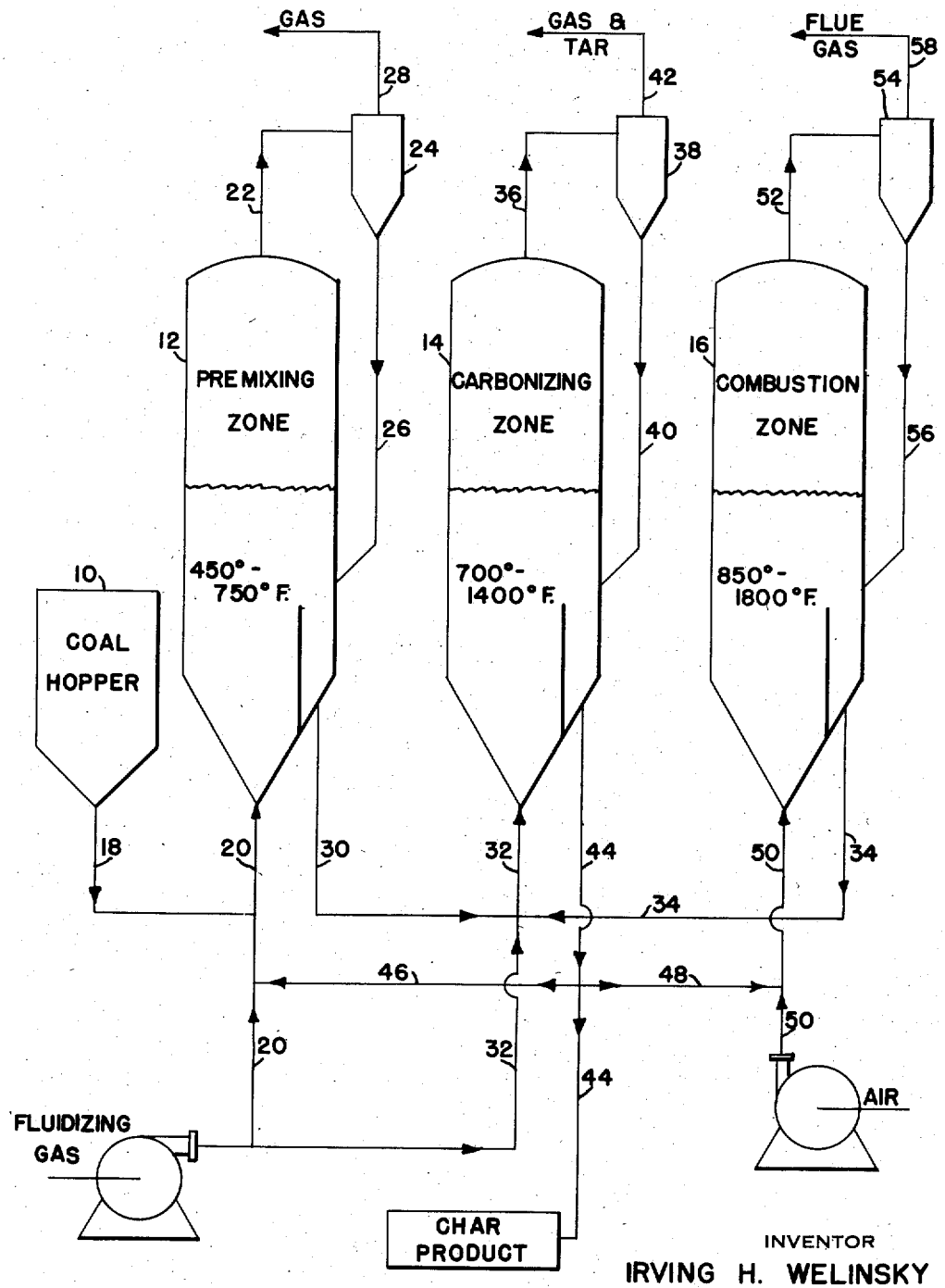
INVENTOR
IRVING H. WELINSKY
BY D. Leigh Fowler, Jr.
ATTORNEY United States Patent Office Re. 24,574
Reissued Dec. 9, 1958

24,574

CARBONIZATION OF AGGLOMERATIVE COALS

Irving H. Welinsky, Pittsburgh, Pa., assignor to Consolidation Coal Company, a corporation of Pennsylvania Original No. 2,677,650, dated May 4, 1954, Serial No. 85,304, April 4, 1949. Application for reissue April 18, 1956, Serial No. 579,124

5 Claims. (Cl. 202—14)

Matter enclosed in heavy brackets [ ] appears in the original patent but forms no part of this reissue specification; matter printed in italics indicates the additions made by reissue.

This invention relates to the carbonization of coals which have a tendency to agglomerate under conditions of carbonization and, more particularly, to methods and apparatus for converting agglomerative coals to a high B. t. u. gas, high quality tar, and a solid carbonaceous residue containing some volatile matter.

The primary object of this invention is to provide an improved method and apparatus for carbonizing agglomerative coals.

Another object of my invention is to provide a method of carbonizing agglomerative coals which employs the solid carbonaceous residue from previously carbonized coal as the heat transfer medium and also as the medium for preventing agglomeration.

A still further object of the present invention is to provide a method of producing high B. t. u. gas, high quality tar, and a carbonaceous solid residue suitable for combustion from coals which have a tendency to agglomerate when heated under carbonizing conditions.

It has previously been proposed to use the solid residue of carbonization to transmit heat by direct heat exchange to the coal to effect carbonization. At the same time, it was recognized that the solid residue by virtue of its dilution of the coal served to prevent agglomeration of the coal during the time it is in a plastic condition. However, the amount of solid residue or char which is required to prevent agglomeration in the carbonization zone and the amount of char that is needed to supply the heat of carbonization are not the same, the former being much larger than the latter. Consequently, the capacity of the system, that is, the throughput of fresh coal to be carbonized is greatly reduced by virtue of the fact that so much char must be recycled to establish non-agglomerating conditions.

In accordance with my invention, I have provided a method of carbonizing agglomerative coal which comprises dividing the stream of hot carbonaceous residue from the carbonization zone into at least three parts. One of these parts represents the net yield of char for use as fuel in power plants and the like. One of the other two parts is mixed, while still at an elevated temperature, with fresh finely divided coal before introduction into the carbonization zone in such quantity that the temperature of the resulting mixture lies between 450° and 750° F. and below the carbonizing temperature of the fresh coal. The third part is conveyed to a combustion zone where a portion thereof is burned to raise the temperature to 850° to 1800° F. Preferably, the amount of char conducted to the combustion zone is such that in order to raise the temperature to the specified range, all of the volatile content of the char is consumed and some portion of the fixed carbon of the char. This heated char is then conveyed directly to the carbonization zone where it is maintained in intimate contact with the fresh coal introduced to the zone as a part of the previously described mixture of char and coal. The temperature of the carbonization zone is maintained in the range 750° to 1400° F. The temperature of the combustion zone is at least 50 degrees higher than the temperature of the carbonization zone.

I have discovered that the practice of the method described in the previous paragraph not only produces high B. t. u. gas, a large yield of high quality tar, and a carbonaceous residue or char of controllable volatile content but also that the process can be carried out continuously with substantially no agglomeration to impair the operation. Furthermore, the amount of char recycled through the system for the purpose of supplying heat and preventing agglomeration is considerably less than that required if all of the char used for these purposes is circulated through the combustion zone and then directly to the carbonization zone. In essence, my invention provides for the most efficient use of the char for its two distinct functions of preventing agglomeration and supplying heat. In one case, the agglomeration tendency is reduced by pretreatment of the coal with one portion of the char and in the other instance, the heat is provided by combustion of a separate portion of the char followed by introducing the resulting hot char and non-agglomerating mixture of char and coal to the carbonization zone where the actual carbonization takes place.

For a better understanding of my invention, reference should be had to the following detailed description of a preferred embodiment of my invention and also the accompanying drawing in which is diagrammatically illustrated an apparatus for carrying out a preferred method of carbonization in accordance with my invention.

Referring specifically to the drawing, a detained description will now be given of the operation of a preferred embodiment of my invention. I prefer to use Pittsburgh Seam coal which is a strongly coking high volatile bituminous coal. It is understood, however, that any coal having a tendency to agglomerate under conditions of carbonization may be treated in accordance with my invention. Numeral 10 designates a coal hopper which serves as a source of supply of finely divided coal. Numeral 12 designates a pretreatment zone in which the finely divided coal is treated to reduce its agglomerating tendencies. Numeral 14 designates the carbonization zone in which the coal is converted to high B. t. u. gas, tar, and carbonaceous residue. Numeral 16 refers to a combustion zone in which a portion of the product char is heated to an elevated temperature by burning a portion thereof.

Finely divided coal from hopper 10 is conducted through a conduit 18 to a conduit 20 where it is picked up by a stream of fluidizing gas (which is inert, i.e., non-oxidizing such as steam or nitrogen, etc.) and carried into the pretreatment zone 12. At the same time, finely divided char from the carbonization zone 14 is picked up by the stream of gas in conduit 20 and carried into the pretreatment zone. The latter preferably comprises a cylindrical vessel which is adapted to confine a fluidized bed of solids comprising finely divided coal and hot char. The size of the solids and the velocity of the gas stream entering the zone through conduit 20 are regulated to produce fluidization in accordance with the principles already well understood in the art. For example, the velocity of the gas may be between 0.1 ft./sec. and 2.0 ft./sec. and the size of the particles between 10 and 325 mesh. The temperature of the char as it leaves the carbonization zone is approximately 700° to 1400° F. depending upon the temperature at which that zone is maintained. A sufficient amount of this hot char is mixed with the fresh feed in the premixing zone to raise the temperature of the fluidized bed therein to between 450° and 750° F. but below the carbonization temperature of the coal. The fluidizing gas and any volatile products resulting from holding the coal within this temperature range are conducted by conduit 22 through a cyclone separator 24 from which the separated solids are conveyed back to the fluidized bed in the premixing zone by conduit 26. The solid free gas is then conducted to any suitable place for treatment as desired through conduit 28.

The coal is allowed to remain in the premixing zone for a sufficient time for it to become thoroughly mixed with the char and to reach the previously specified temperatures. It is then conducted in admixture with the char through conduit 30 to a conduit 32 leading to the carbonization zone. It is picked up in conduit 32 by an inert gas stream and carried into the carbonization zone which again comprises preferably a cylindrical vessel adapted to confine a fluidized bed. The stream of gas entering through conduit 32 serves to maintain the finely divided solids in a fluidized state. At the same time this stream of gas picks up hot char carried by conduit 34 from the combustion zone 16. This char is at a temperature between 850° and 1800° F. and is in such amount with respect to the char-coal mixture from the premixing zone 12 that the resulting temperature of the bed within the carbonization zone lies between 700° and 1400° F. In any event, the temperature of the char from the combustion zone is at least 50 degrees higher than that maintained in the carbonization zone. Carbonization of the fresh coal is effected in the fluidized bed by the direct transfer of heat from the char particles. No agglomeration of the coal within the zone takes place because of the premixing in the zone 12. Thus the passage of the coal through the plastic condition takes place out of contact with other coal particles. The vaporous products and fluidizing gas are removed through conduit 36 to a cyclone separator 38. The separated solids are returned to the fluidized bed through conduit 40 while the tar and non-condensable gases are conveyed through conduit 42 for further separation and purification.

The carbonaceous residue produced in the carbonization zone 14 is continuously removed therefrom through a conduit 44. This product char which is at a temperature between 700° and 1400° F. is divided into three streams. One stream is conducted to product storage through conduit 44 and stored there until such time that it may be needed as fuel in power plants and the like. The second stream passes through conduit 46 to the conduit 20 where it mixes with the fresh coal feed as previously described. A third stream is conducted through conduit 48 to a conduit 50 where it is picked up by air or oxygen and carried into the combustion zone 16. This zone again is preferably a cylindrical vertical vessel in which a fluidized bed of solids may be confined. The air stream is at such a velocity that a fluidized bed of the char is established within the zone. The temperature is maintained between 850° and 1800° F. and at a temperature at least 50 degrees higher than that maintained in the carbonization zone by burning a portion of the char. As previously stated, it is preferred that the amount of char circulated through the combustion zone for the purpose of supplying heat of carbonization is such that all of the volatile matter and part of the fixed carbon of the char must be burned to raise its temperature to the specified range of 850° to 1800° F. The products of combustion or flue gas along with the fluidizing gas is conducted through conduit 52 to a cyclone separator 54. The separated solids are returned to the fluidized bed by means of conduit 56 while the flue gas is carried away through conduit 58. The hot char is continuously removed from the combustion zone through conduit 34 and recycled to the carbonization zone in the manner already described.

It is to be understood that the above example is by way of illustration only. If desired, the use of fluidized systems such as described and illustrated may be replaced by rotary kilns, in some or all of the zones, or by any equivalent device.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of carbonizing an agglomerative coal which comprises feeding said coal in finely divided condition and finely divided carbonaceous residue from previously carbonized coal to a carbonization zone, said residue being at a temperature sufficiently high and in sufficient quantity to maintain said zone above the carbonizing temperature of the coal but below 1400° F., agitating said coal and said residue in direct heat transfer relationship in said zone until the coal is carbonized to volatile hydrocarbonaceous products and carbonaceous solid residue, removing solid residue from said zone, conducting a portion thereof to a combustion zone which is maintained at a temperature between 850° and 1800° F. by burning a part of said residue, the temperature of said combustion zone being at least 50° F. above the temperature in the carbonization zone, conveying the resulting heated portion to the carbonization zone, and mixing another portion of said residue from the carbonization zone while still at an elevated temperature with the coal, before the latter is fed to the carbonization zone, in sufficient quantity to raise the temperature of the coal to between 450° and 750° F. but below the carbonizing temperature of the coal.

2. The method of carbonizing strongly coking high volatile bituminous coal which comprises feeding said coal in finely divided condition and finely divided carbonaceous residue from previously carbonized coal to a carbonization zone, said residue being at a temperature sufficiently high and in sufficient quantity to maintain said zone above the carbonizing temperature of the coal but below 1400° F., agitating said coal and said residue in direct heat transfer relationship in said zone until the coal is carbonized to volatile hydrocarbonaceous products and carbonaceous solid residue, removing solid residue from said zone, conducting a portion thereof to a combustion zone which is maintained at a temperature between 850° and 1800° F. by burning a part of said residue, the temperature of said combustion zone being at least 50° F. above the temperature in the carbonization zone, conveying the resulting heated portion to the carbonization zone, and mixing another portion of said residue from the carbonization zone while still at an elevated temperature with the coal, before the latter is fed to the carbonization zone, in sufficient quantity to raise the temperature of the coal to between 450° and 750° F. but below the carbonizing temperature of the coal.

3. The method of carbonizing an agglomerative coal which comprises feeding said coal in finely divided condition and finely divided carbonaceous residue from previously carbonized coal to a carbonization zone, said residue being at a temperature sufficiently high and in sufficient quantity to maintain said zone above the carbonizing temperature of the coal but below 1400° F., agitating said coal and said residue in direct heat transfer relationship in said zone until the coal is converted to volatile hydrocarbonaceous products and carbonaceous solid residue, transferring a portion of the solid residue from the carbonization zone to a combustion zone, burning the volatile material and a part of the fixed carbon of said transferred residue to maintain a temperature between 850° and 1800° F. in the combustion zone, the temperature of the combustion zone being at least 50° F. above the temperature in the carbonization zone, conveying the resulting heated portion to the carbonization zone, and mixing another portion of the residue from the carbonization zone while still at an elevated temperature with the coal, before the latter is fed to the carbonization zone, in sufficient quantity to raise the temperature of the coal to between 450° and 750° F. but below the carbonizing temperature of the coal.

4. The method of carbonizing strongly coking high volatile bituminous coal which comprises feeding said coal in finely divided condition and finely divided carbonaceous residue from previously carbonized coal to a carbonization zone, said residue being at a temperature sufficiently high and in sufficient quantity to maintain said zone above the carbonization temperature of the coal and below 1400° F., circulating an inert gas through the mixture of residue and coal in said zone under fluidizing conditions until the coal is carbonized to volatile hydrocarbonaceous products and carbonaceous solid residue, removing solid residue from said zone, conveying a portion thereof to a combustion zone, circulating a gas containing oxygen gas through said residue in said combustion zone under fluidizing conditions and burning a portion of said residue to maintain the temperature in said zone between 850° and 1800° F., and at least 50° F. above the temperature in the carbonization zone, conveying the resulting heated portion to the carbonization zone, mixing under fluidizing conditions another portion of said residue from the carbonization zone while still at an elevated temperature with fresh coal before the latter is fed to the carbonization zone in sufficient quantity to raise the temperature of the coal to between 450° and 750° F. but below the carbonizing temperature of the coal.

5. The method of carbonizing an agglomerative coal which comprises feeding said coal in finely divided condition and finely divided carbonaceous residue from previously carbonized coal to a carbonization zone, said residue being at a temperature sufficiently high and in sufficient quantity to maintain said zone between about [800° and 1200°] *750° and 1400° F.*, agitating said coal and said residue in direct heat transfer relationship in said zone until the coal is carbonized to volatile hydrocarbonaceous products and carbonaceous solid residue, removing solid residue from said zone, conducting a portion thereof to a combustion zone which is maintained at a temperature substantially above the temperature in the carbonization zone, conveying the resulting heated portion to the carbonization zone, and mixing another portion of said residue from the carbonization zone while still at an elevated temperature with the coal, before the latter is fed to the carbonization zone, in sufficient quantity to raise the temperature of the coal to between about [500° and 650°] *450° and 750° F.* but below the carbonizing temperature of the coal.

References Cited in the file of this patent or the original patent

UNITED STATES PATENTS

| | | |
|---|---|---|
| 1,712,082 | Koppers | May 7, 1929 |
| 1,899,887 | Thiele | Feb. 28, 1933 |
| 1,983,943 | Odell | Dec. 11, 1934 |
| 2,445,327 | Keith | July 20, 1948 |
| 2,462,366 | Davis | Feb. 22, 1949 |
| 2,471,119 | Peck et al. | May 24, 1949 |
| 2,480,670 | Peck | Aug. 30, 1949 |
| 2,482,187 | Johnson | Sept. 20, 1949 |
| 2,512,076 | Singh | June 20, 1950 |
| 2,534,051 | Nelson | Dec. 12, 1950 |
| 2,582,710 | Martin | Jan. 15, 1952 |
| 2,582,712 | Howard | Jan. 15, 1952 |
| 2,622,059 | Lesher | Dec. 16, 1952 |

FOREIGN PATENTS

| | | |
|---|---|---|
| 189,542 | Great Britain | Dec. 1, 1922 |
| 18,102 | Australia | Sept. 9, 1929 |
| 582,055 | Great Britain | Nov. 4, 1946 |
| 586,391 | Great Britain | Mar. 18, 1947 |